(12) United States Patent
Toepel et al.

(10) Patent No.: US 9,410,845 B1
(45) Date of Patent: Aug. 9, 2016

(54) LASER DETECTING SCREEN

(71) Applicants: Michael P. Toepel, Salisbury, NH (US); Ray A. Greeley, Farmington, NH (US)

(72) Inventors: Michael P. Toepel, Salisbury, NH (US); Ray A. Greeley, Farmington, NH (US)

(*) Notice: Subject to any disclaimer, the term of this patent is extended or adjusted under 35 U.S.C. 154(b) by 389 days.

(21) Appl. No.: 13/731,165

(22) Filed: Dec. 31, 2012

(51) Int. Cl.
*H01L 31/0232* (2014.01)
*G01J 1/44* (2006.01)
*G01J 1/32* (2006.01)

(52) U.S. Cl.
CPC ..... *G01J 1/44* (2013.01); *G01J 1/32* (2013.01)

(58) Field of Classification Search
CPC ....... H01L 31/02325; G09G 5/10; G09G 3/36
USPC ............. 250/349, 330, 338.1, 339.05, 339.01
See application file for complete search history.

(56) References Cited

U.S. PATENT DOCUMENTS

| | | | | |
|---|---|---|---|---|
| 3,753,116 A | * | 8/1973 | Kolbly | 343/703 |
| 7,468,721 B2 | * | 12/2008 | Nakano | 345/102 |
| 2003/0231161 A1 | * | 12/2003 | Yamaguchi | 345/102 |
| 2004/0095402 A1 | * | 5/2004 | Nakano | 346/102 |
| 2008/0055495 A1 | * | 3/2008 | Cernasov | 349/12 |
| 2008/0122994 A1 | * | 5/2008 | Cernasov | 349/1 |
| 2009/0167676 A1 | * | 7/2009 | Edwards et al. | 345/102 |
| 2009/0289175 A1 | * | 11/2009 | Mahowald et al. | 250/216 |
| 2010/0090996 A1 | * | 4/2010 | Chou et al. | 345/207 |
| 2011/0199352 A1 | * | 8/2011 | Wheatley et al. | 345/207 |
| 2011/0292963 A1 | * | 12/2011 | Banfield et al. | 374/6 |
| 2013/0278147 A1 | * | 10/2013 | Vetsuypens et al. | 315/151 |
| 2014/0183342 A1 | * | 7/2014 | Shedletsky et al. | 250/215 |

* cited by examiner

*Primary Examiner* — David Porta
*Assistant Examiner* — Djura Malevic
(74) *Attorney, Agent, or Firm* — Joanne M Martin

(57) ABSTRACT

A substantially planar or curved panel having a plurality of radiant energy sensors disposed about the periphery of the panel which sensors detect a portion of radiant (e.g. laser) energy incident on to the planar panel reflected or refracted to the planar panel periphery or non-periphery surface. From the radiant energy detected by a plurality of peripherally (or other surface) disposed sensors, information such as intensity, may be rapidly determined in a non-destructive environment and related instrumentation is controlled. In one embodiment, the source of radiant energy is controlled, e.g. turned off, in response to radiant energy deemed excessive, received on the exemplary embodiments of the present invention.

23 Claims, 5 Drawing Sheets

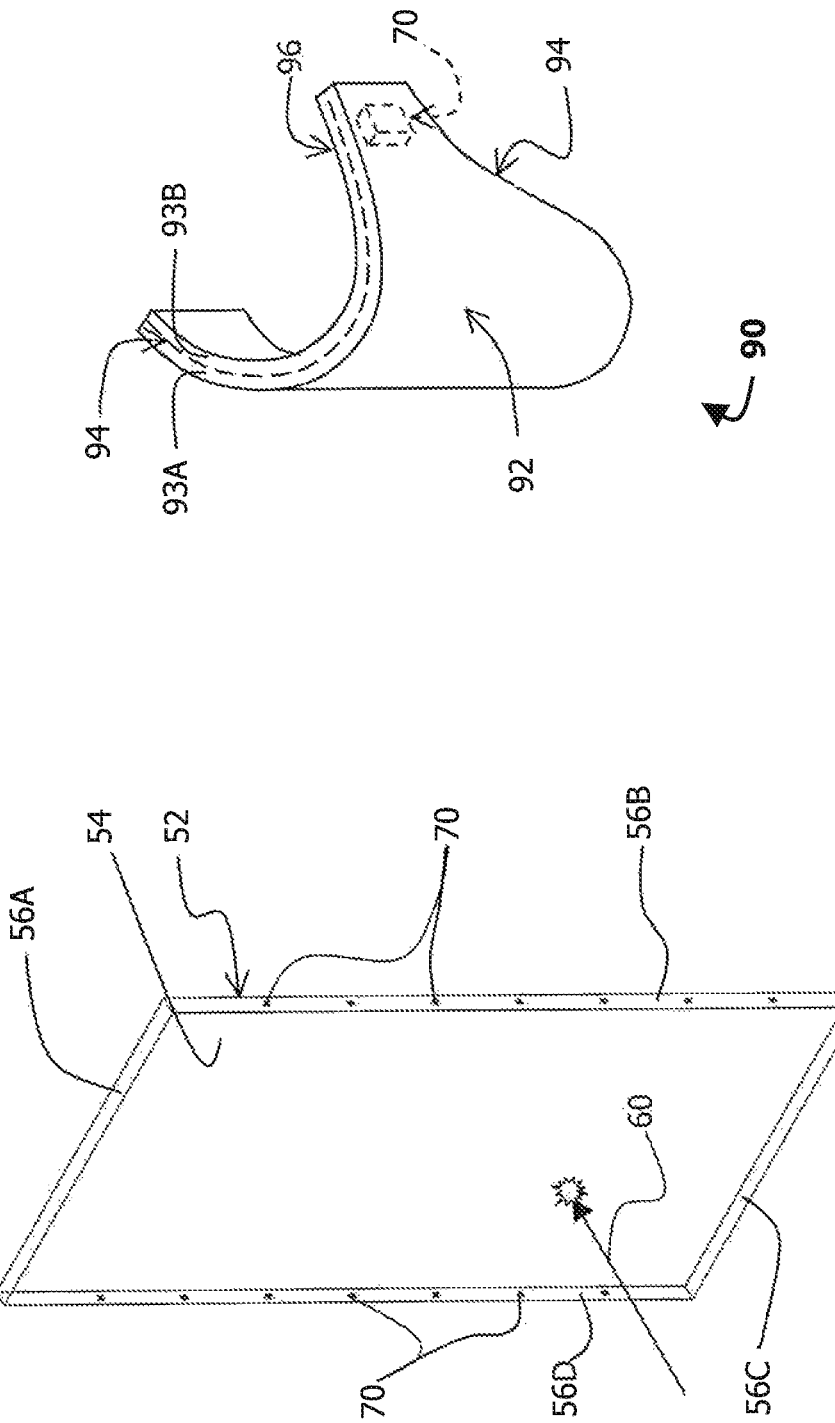

LASER DETECTING SCREEN

FIELD OF THE INVENTION

The present invention relates to laser beam detecting apparatus, in particular modular discrete laser beam detecting apparatus having an extendable planar configuration and selectively permitting radiant energy to pass therethrough.

BACKGROUND OF THE INVENTION

Laser beam detection is often provided by evidence of destruction of surfaces surrounding the particular laser apparatus, and furthermore, the measurements (e.g. location, burn size, etc are manually taken. Moreover such surface markings are typically permanent and cumulatively act to diminish the purpose of the surface whatever that may be, e.g. barriers, process components, curtains, etc. Additionally, such manual responses may be inaccurate, unrepeatable and sufficiently slow to minimize any value in certain applications, e.g. safety.

SUMMARY OF THE INVENTION

The present invention provides a substantially planar panel having a plurality of radiant energy sensors disposed about the periphery of the panel, which sensors detect a portion of radiant energy incident on to the planar panel reflected or refracted to the planar panel periphery. From the radiant energy detected by a plurality of peripherally disposed sensors, information such as intensity, etc. may be rapidly determined in a non-destructive environment. In one embodiment, the source of radiant energy is controlled, e.g. turned off, in response to panel or screen received radiant energy deemed excessive.

BRIEF DESCRIPTION OF THE DRAWING

These and further embodiments of the present invention may be better understood by reading the following Detailed Description together with the Drawing figures, wherein:

FIG. 1 is a perspective view of one embodiment of the present invention;

FIG. 3 is perspective view of a third embodiment of the present invention;

DETAILED DESCRIPTION

Figure 1A:
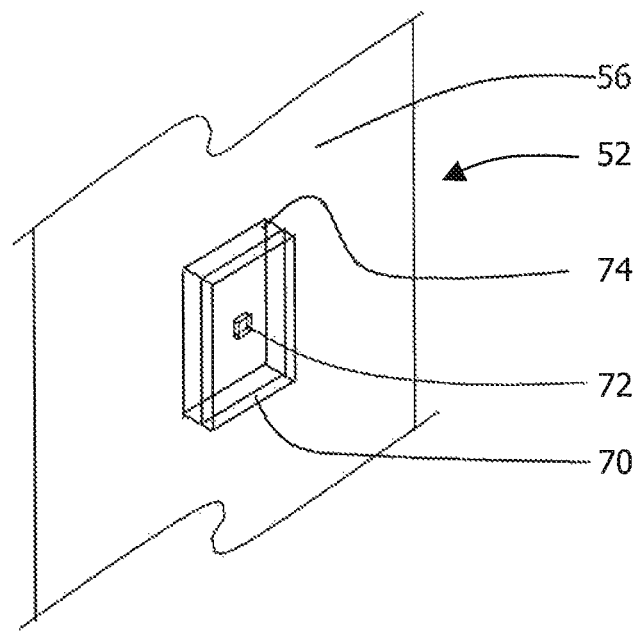
FIG. 1A is a perspective view of a portion of the embodiment of FIG. 1.

As shown in FIG. 1, the typical embodiment 50 of the laser detecting screen according to the present invention includes a material 52 of a defined thickness and being at least partially radiant energy transmissive from front surface 54 of the material 52. Incident radiant energy 60, such as from a laser, strikes the front surface 54 and at least a portion of the incident energy travels internally to peripheral edges of the material 52, and from the peripheral edge, travels to proximal radiant energy sensor boards 70. In the particular embodiment of FIG. 1, the screen material 52 is rectangular, substantially planar, and includes four peripheral edges 56A, 56B, 56C, and 56D, where peripheral edges 56B and 56D have at least one radiant energy detector positioned to receive radiant energy from the proximal portion of the corresponding peripheral edge.

A closer view of a typical sensor board 70 is shown in FIG. 1A, wherein a light sensor 72, e.g. a AMS/TAOS TLS2571, described in technical product specifications and applications material included by reference, is mounted with a radiant energy (visible and IR light) sensor disposed facing an edge 56 of the radiant energy absorbing to receive the radiant energy emitted from the proximal edge 56. In one embodiment, a filter 74 is interposed between a sensor 72 and the edge 56 to allow a selected band, e.g. infrared light, to be received and detected by the sensor 72. Alternately, the material 52 may include radiation filtering elements or substances such as an infrared filter 74. The typical sensor board 70 may include further components (e.g. forming a circuit board) facilitating connection to and communication with corresponding modules, e.g. a controller 102 discussed below or other sensor boards according to the present invention.

Figure 2:
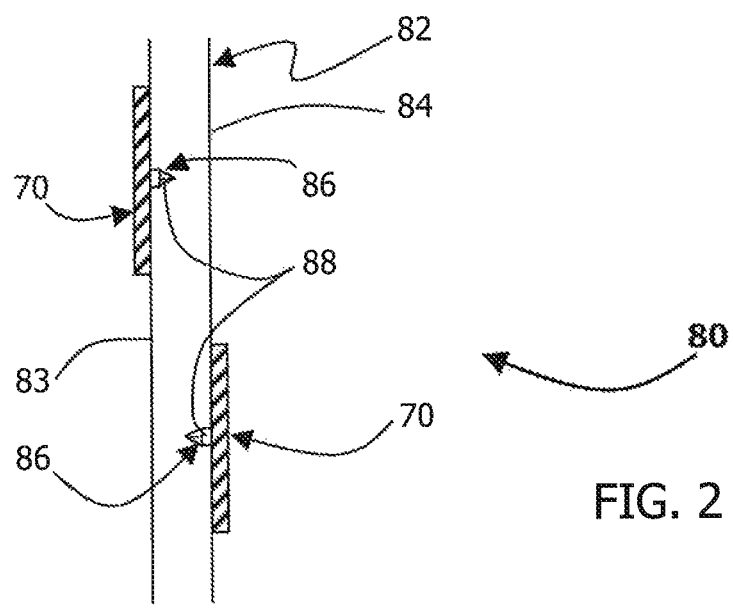
FIG. 2 is a perspective view of a second embodiment of the present invention.

An alternate embodiment 80 of FIG. 2 mounts sensor boards 70 having sensors facing into a material 82 surface, e.g. a front surface 83 or a rear surface 84 having an optional recess 86 therein. Also optionally included is a radiation coupler 88 to facilitate efficient transfer of radiant energy from the internal regions of the material 82 to the sensor on the sensor board 70. Other embodiments omit the recess 86, receiving radiant energy by direct contact with (or via a transmissive or filtering medium) of the sensor 72 with a front or rear (or other) surface. In further alternative embodiments, the radiation coupler comprises a radiation filter material such as an infrared light filter allowing the sensor on the sensor board 70 to reject radiation outside the desired (e.g. infrared) spectrum.

A further alternative embodiment 90 of FIG. 3 shows a curved (non-planar) material 92 wherein sensor boards 70 (or bare sensors) may be deployed to receive radiant energy at a peripheral edge 94 or as shown, coupled from a curved front or rear 96 surface (optionally via a radiation coupler) as shown and discussed above. Further alternative embodiments also envision a material having multiple layers, e.g. 93A, 93B, one or more of which may provide selected filtering of the received incident radiation on its way to the detector board 70.

Figure 4:
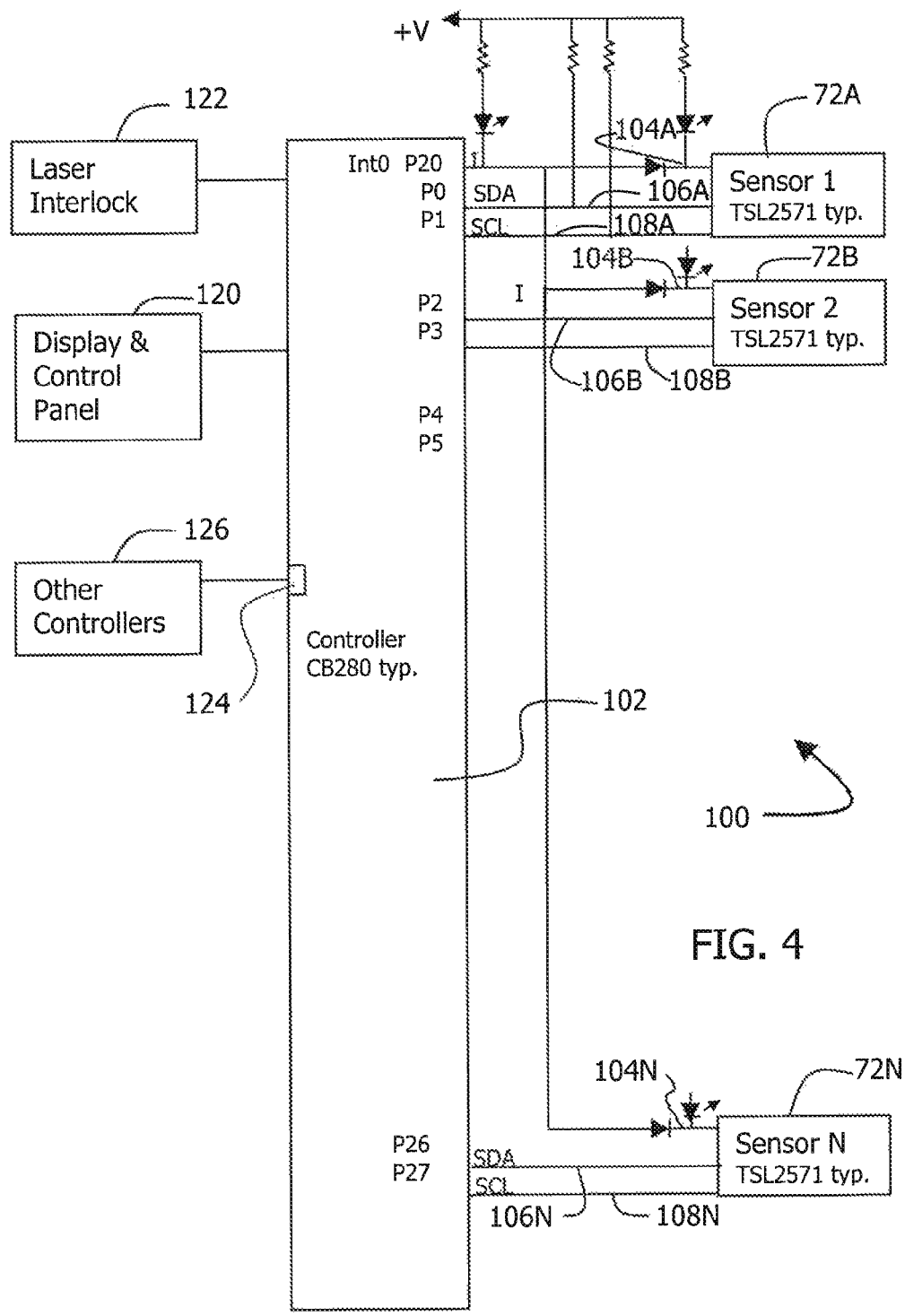
FIG. 4 is block diagram of one embodiment of the present invention.

In one embodiment 100 of a further portion of the present invention shown in FIG. 4, one or more of the detector boards 70 or the individual sensors 72 communicate with a controller 102 by appropriate interconnections, such as data bus structures or as shown in FIG. 4, I2C serial data format from the individual radiation (e.g. TSL2571) sensors 72A, 72B, ... 72N data lines 104A, 104B, ... 104N and clock lines 106A, 106B, ... 106N to individual controller input ports (pins), and in this instance, commonly connected interrupt lines 108A, 108B, ... 108N, from each sensor connected to the controller 102, such as a CUBLOC™ CB280 controller manufactured by Comfile Technologies, Inc., the specifications, instructions and application material being incorporated by reference herewith. In the particular embodiment 100, the interrupt lines include diodes 110 to permit a wired logical OR connection of the interrupt from any sensor to the controller 102. Also included are light emitting diodes to visually signal the occurrence and origin of an interrupt signal.

One particular embodiment of the system incorporating the controller 102 and the TSL2571 sensors 72 provides that the controller loads a specific threshold signal into each sensor 72A, 72B, ... 72N, such that the corresponding sensors do not invoke an interrupt until a received radiant energy level equals or exceeds the corresponding threshold signal level, at which time the interrupt is pulled low causing the controller 102 to respond, and in one embodiment, interrupt the source of the radiation via the interlock 122.

Typically the controllers (e.g. 102) are operable according to programmed instruction as described according to an exemplary embodiment below with regard to the flow charts of FIGS. 5-6 discussed below. Furthermore, the controller responds to user commands and reports to the user via a control and display panel 120 interfaced with the controller as appropriate for the display and control panel 120, controller 102 to implement the various embodiments according to the present invention. Typically, the embodiment of FIG. 4 provides a control signal to a controller 122 source of radiant energy that the radiation was detected by use of the panels, sensors and controllers according to the present invention, to disable (or otherwise control) the output of the source of radiant energy. Moreover, the system according to the embodiment 100 of FIG. 4 includes a communication port 124 to communicate with other similar controllers 126, corresponding to other laser detecting screens to provide combined or integrated laser detection operations, e.g. disable the radiant energy source 122 in response to a report of stray energy received by another screen and sensor via controller 126 communicating with the controller 102. Other inter-controller communications can include the sharing of initialization information discussed below with regard to the embodiment of FIG. 6, discussed further below.

Figure 5:
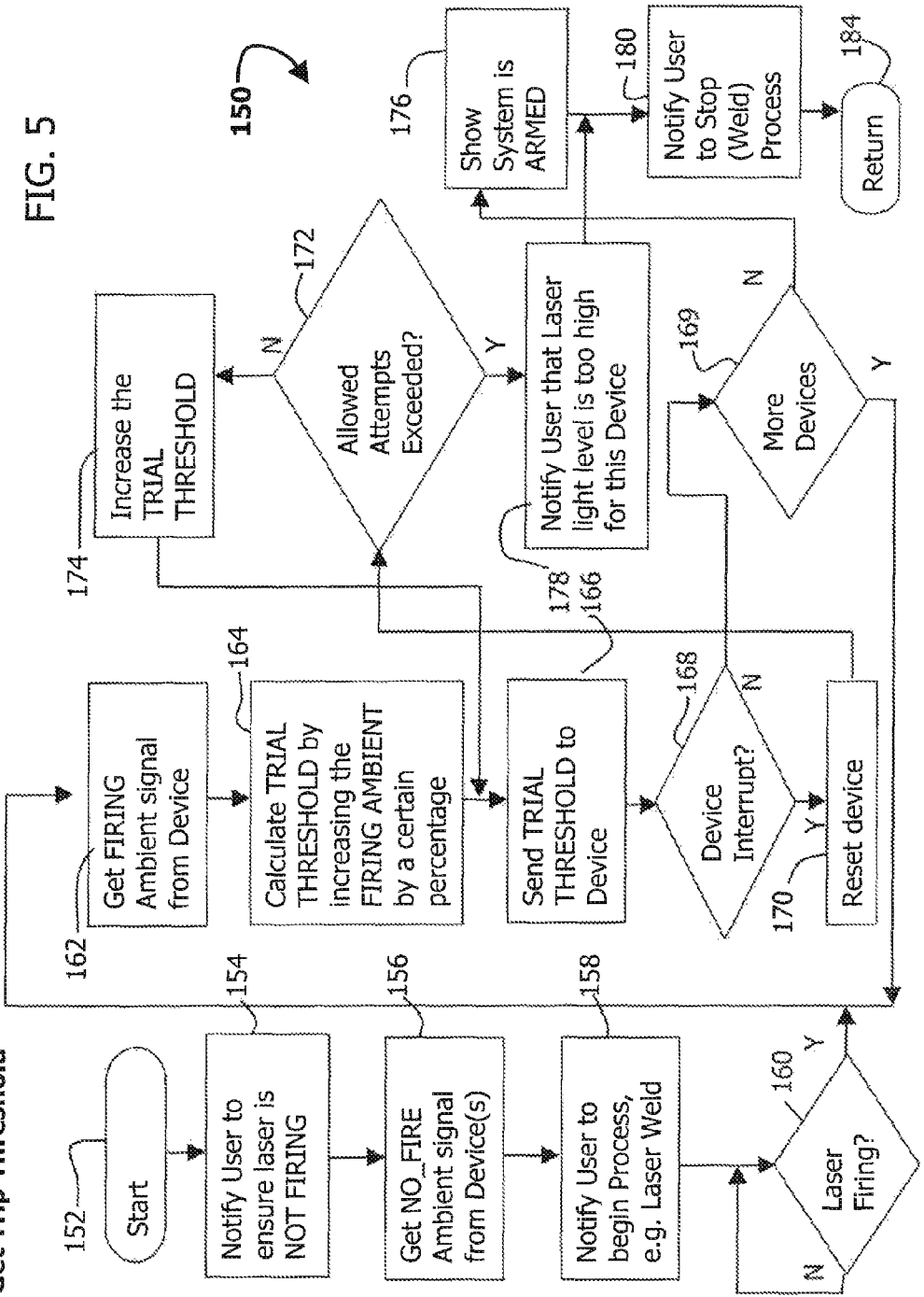
FIG. 5 is a flow chart of one process according to an exemplary embodiment of the present invention.

A general initialization flow chart 150 for an exemplary embodiment according to the present invention is shown in FIG. 5, including a further feature according to the present invention to monitor acceptable received radiation levels and from determined or learn acceptable received radiation levels, establish a threshold at which point the systems becomes operational, e.g. to inhibit the source of radiant energy, as shown by an exemplary flow chart 150 of FIG. 5.

Typically the routine 150 of FIG. 5 is run initially or whenever the user changes the radiant energy (e.g. laser) environment. For instance, during normal operations of a laser, there may be scattered laser light that hits one (or more if used) detection screens, and as such is considered normal and not an event to trigger or trip an alarm or disable the energy source (laser). To configure (initialize) the system to ignore this threshold level of [laser] light, the laser must be fired while the system according to one embodiment of the present invention learns a toleration level and establishes the corresponding 'trip' point threshold for received radiation deemed excessive or unsafe. Once started 152, the user is notified (e.g. by display and control panel 120) to ensure that the laser is not firing, 154, and to store (in the individual sensors) a signal corresponding to the non-firing ambient light level signal, 156, and thereafter notifying the user 158 to begin the process, e.g. laser welding. Once it is established that the laser is firing, 160, a new 'firing' ambient received energy level is stored (in each sensor) and a trial percentage threshold level is calculated, 164, and sent to each sensor 72, 166. Typically in one embodiment, the percentage by which the FIRING AMBIENT signal is increased to arrive at a TRIAL THRESHOLD is a variable that is entered when the system is initially installed or configured. The higher the percentage, the faster the FINAL THRESHOLD will be achieved but at the expense of possibly overshooting the optimal threshold where the system TRIPS (i.e. the system will not be sensitive enough). The lower the percentage the longer it will take to arrive at the FINAL THRESHOLD but the FINAL THRESH-OLD might be too close to the ambient (i.e. the system would be too sensitive and prone to false 'trips'. If at the trial threshold level a sensor threshold is achieved (i.e. device 'tripped'), 168, then the sensor is reset, 170, and if the number of laser firing attempts is not exceeded, 172, the trial threshold percentage is increased or adjusted 174 and if the sensor is again triggered, 168, but not exceeding the number of attempts allowable, 172, the trial threshold is again adjusted 174 and the laser firing is again attempted. However, should the number of attempts exceed the number of attempts allowable, then the user is informed that the radiation (laser light) level is too high, 178, and user is notified to stop the process (e.g. welding) 180, and the process ends or returns, 184. If during this process a trial level is selected such that a sensor 72 is not tripped and does not issue an interrupt, 168, the display and control panel 120 shows the system to be armed, 176, the radiant energy (laser) operation is stopped, 180, the upper 'trip' threshold saved to each sensor(s) 169, and the process ends or returns, 184.

Figure 6:
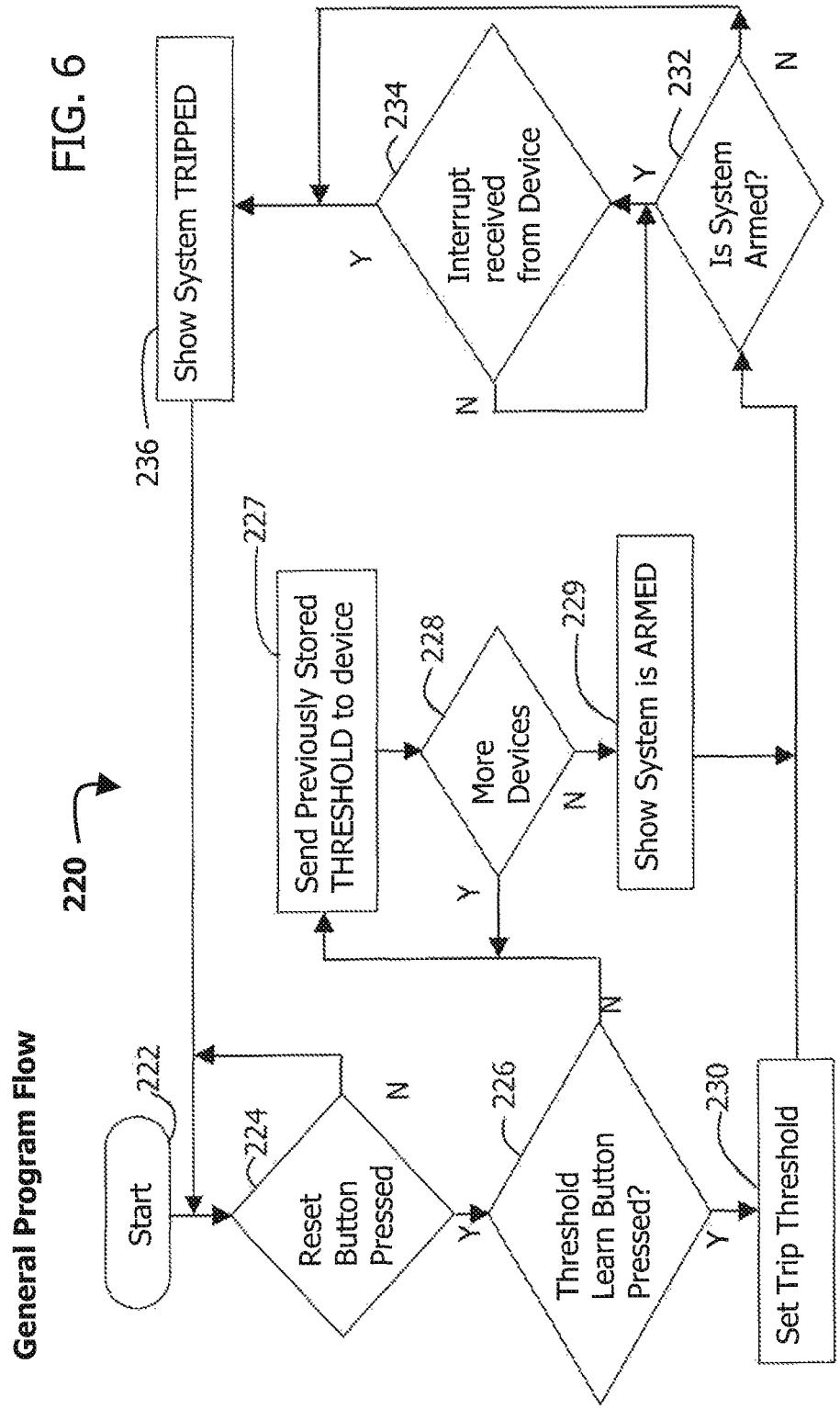
FIG. 6 is a flow chart of a second process according to an exemplary embodiment of a further feature of the present invention.

The above exemplary process and apparatus may be incorporated into a process 220 according to FIG. 6, wherein after initiation 222, if a reset button is pressed 224, and a 'threshold learn' button is pressed 226, the 'Trip' threshold is set 230 (via FIG. 5). If the system is armed 232 after completing the flowchart of FIG. 5, and an interrupt is received from a device 72, a corresponding display provided 236, showing the system has tripped due to an interrupt received from a sensor 72, corresponding to a received radiant (laser) energy (at or above one or more sensor thresholds) detected, and typically provides a visual or audible alarm, e.g. at the display and control panel 120 or elsewhere and remains in that state until the reset button is pressed, 224 and the process begins again.

Additional embodiments provide a screen that is front-to-back at least partially transmissive to radiant energy, and such energy being the same or different wavelength or other characteristic than the energy internally reflected to the energy received by the sensors. Sensors continuously polled by a controller, parallel sensor/controller communications, and detected radiant energy threshold stored and determination of sensor-received radiation meeting or exceeding the threshold at the controller are also within the scope of the present invention. Further alternate embodiments may include a radiation diffusing surface between at or prior to the sensors, and sensors (with or without filters) responsive to visible light provided from or in response to incident radiation. Further modifications and substitutions according to the present invention made by one of ordinary skill in the art are within the scope of the invention that is not to be limited except by the claims, which follow.

What is claimed is:

1. A laser detecting screen comprising:
a panel having a front surface, a thickness and a peripheral edge providing an emission therefrom of a minor portion of front surface incident radiant energy;
a plurality of radiant energy sensors disposed along said panel peripheral edge each providing a signal in response to correspondingly received peripheral edge emission; and
a controller connected to said plurality of radiant energy sensors providing an output signal in response to a ray of radiant energy incident onto said panel, wherein
said plurality of sensors are connected to each receive a specific received radiation threshold data signal from said controller and each of said plurality of sensors is inhibited from providing said signal in response to correspondingly received peripheral edge emission until a received corresponding peripheral edge emission equals or exceeds said corresponding received radiation threshold data signal.

2. The laser detecting screen of claim 1, wherein said panel includes radiant energy diffusing surface.

3. The laser detecting screen of claim 1, wherein said panel comprises a substantially planar panel.

4. The laser detecting screen of claim 1, wherein said radiant energy sensors are responsive to a selected band of radiant energy.

5. The laser detecting screen of claim 1, wherein said radiant energy sensor signals are in response to Infrared Light energy.

6. The laser detecting screen of claim 5, wherein said radiant energy sensors are only responsive to infrared light energy.

7. The laser detecting screen of claim 5, wherein said radiant energy sensors comprise infrared sensors.

8. The laser detecting screen of claim 5, wherein said planar panel peripheral edge emission is substantially limited to infrared energy emission.

9. The laser detecting screen of claim 8, wherein said planar panel provides passage of non-infrared light energy through said panel thickness.

10. The laser detecting screen of claim 5, further including an infrared light filter disposed between said planar panel and at least one said radiant energy sensor.

11. The laser detecting screen of claim 1, wherein said plurality of radiant energy sensors is disposed on a circuit member attachable to said planar panel.

12. The laser detecting screen of claim 1, wherein
each said radiant energy sensors provides a corresponding unique signal to said controller in response to said received peripheral edge radiation, and wherein
said controller selectively provides a signal to each said radiant energy sensor according to said corresponding unique signal.

13. The laser detecting screen of claim 1, further including a incident radiant energy control signal from said controller generated in response to at least one received said unique signal from at least one of said radiant energy sensors and received by an incident radiation source and operable to inhibit generation of radiant energy from an incident radiant energy source.

14. The laser detecting screen of claim 1, wherein said controller includes a communication port adapted to communicate with a controller of a further panel and corresponding radiant energy sensors.

15. The laser detecting screen of claim 1, wherein a said controller provides at least one of adjustment of sensitivity of radiant energy detection, and adjustment of alarm threshold.

16. The laser detecting screen of claim 15, wherein said radiant energy sensors generate said unique signal to said controller when said alarm threshold is achieved in response to incident radiant energy on said planar panel.

17. The laser detecting screen of claim 16, wherein at least one of said sensitivity and said threshold is provided by a corresponding data signal stored in a corresponding radiant energy sensor.

18. A laser detecting screen comprising:
a panel having a front surface and a thickness between said front surface and a rear surface, and a recess within at least one of said front surface, rear surface and a peripheral edge providing a radiation emission from said recess, of a minor portion of a laser detecting screen front surface incident radiant energy, wherein said panel is front-to-back at least partially transmissive to radiant energy;
a radiant energy sensor disposed to receive said recess radiation emission and providing a signal in response to said received recess emission; and
a controller connected to said radiant energy sensor providing an output signal in response to a ray of radiant energy incident onto said panel.

19. The laser detecting screen of claim 18, further comprising a surface interface disposed between said radiant energy sensor and said recess.

20. The laser detecting screen of claim 19, wherein said surface interface comprises an optical filter having filter characteristics.

21. The laser detecting screen of claim 20, wherein said surface interface comprises an optical filter having infrared passing filter characteristics.

22. The laser detecting screen of claim 19 wherein said recess comprises a recess having a selected recess profile, and said surface interface includes a portion thereof having a shape corresponding to and mating with said recess profile.

23. The laser detecting screen of claim 19 wherein said panel comprises a curved panel.

\* \* \* \* \*